(12) United States Patent
Chattaraj et al.

(10) Patent No.: US 10,742,565 B2
(45) Date of Patent: Aug. 11, 2020

(54) ENTERPRISE MESSAGING SYSTEM USING AN OPTIMIZED QUEUEING MODEL

(71) Applicant: Dell Products, LP, Round Rock, TX (US)

(72) Inventors: Shounak Chattaraj, Bangalore (IN); Balasubramanian Srinivasan, Bangalore (IN); Anshuman Pathak, Bangalore (IN)

(73) Assignee: Dell Products, L.P., Round Rock, TX (US)

(*) Notice: Subject to any disclaimer, the term of this patent is extended or adjusted under 35 U.S.C. 154(b) by 335 days.

(21) Appl. No.: 14/997,755

(22) Filed: Jan. 18, 2016

(65) Prior Publication Data
US 2017/0208014 A1  Jul. 20, 2017

(51) Int. Cl.
  *H04L 12/863* (2013.01)
  *H04L 12/875* (2013.01)

(52) U.S. Cl.
  CPC .......... *H04L 47/624* (2013.01); *H04L 47/564* (2013.01)

(58) Field of Classification Search
  None
  See application file for complete search history.

(56) References Cited

U.S. PATENT DOCUMENTS

| | | | |
|---|---|---|---|
| 6,574,194 B1 | 6/2003 | Sun et al. | |
| 8,762,997 B2 * | 6/2014 | Moon | G06F 9/5072 718/102 |
| 2008/0259927 A1 * | 10/2008 | Evans | H04L 1/0045 370/394 |
| 2012/0078673 A1 | 3/2012 | Koke et al. | |
| 2014/0324959 A1 | 10/2014 | Hudson | |
| 2016/0224380 A1 * | 8/2016 | Wang | G06F 9/546 |

* cited by examiner

*Primary Examiner* — Peter Chen
*Assistant Examiner* — Jeff Banthrongsack
(74) *Attorney, Agent, or Firm* — Larson Newman, LLP

(57) ABSTRACT

An information handling system includes a first provider module to provide a first message and a second provider module to provide a second message, a first memory structure, and a first intermediate integration module. The first intermediate integration module to dequeue the first message from the first queue of the first memory structure prior to the second message in response to a determination that the first delivery time is before the second delivery time, and in response to a determination that the first delivery time is substantially equal to the second delivery time: to determine a first message identifier sequence number for the first message and a second message identifier sequence number for the second message, and to dequeue the second message from the first queue prior to the first message in response to the second message identifier sequence number being lower than the first message identifier sequence number.

19 Claims, 5 Drawing Sheets

ENTERPRISE MESSAGING SYSTEM USING AN OPTIMIZED QUEUEING MODEL

FIELD OF THE DISCLOSURE

The present disclosure generally relates to information handling systems, and more particularly relates to an enterprise messaging system using an optimized queueing model.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. Information handling systems may process events, such as communications over a network and online customer purchases.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
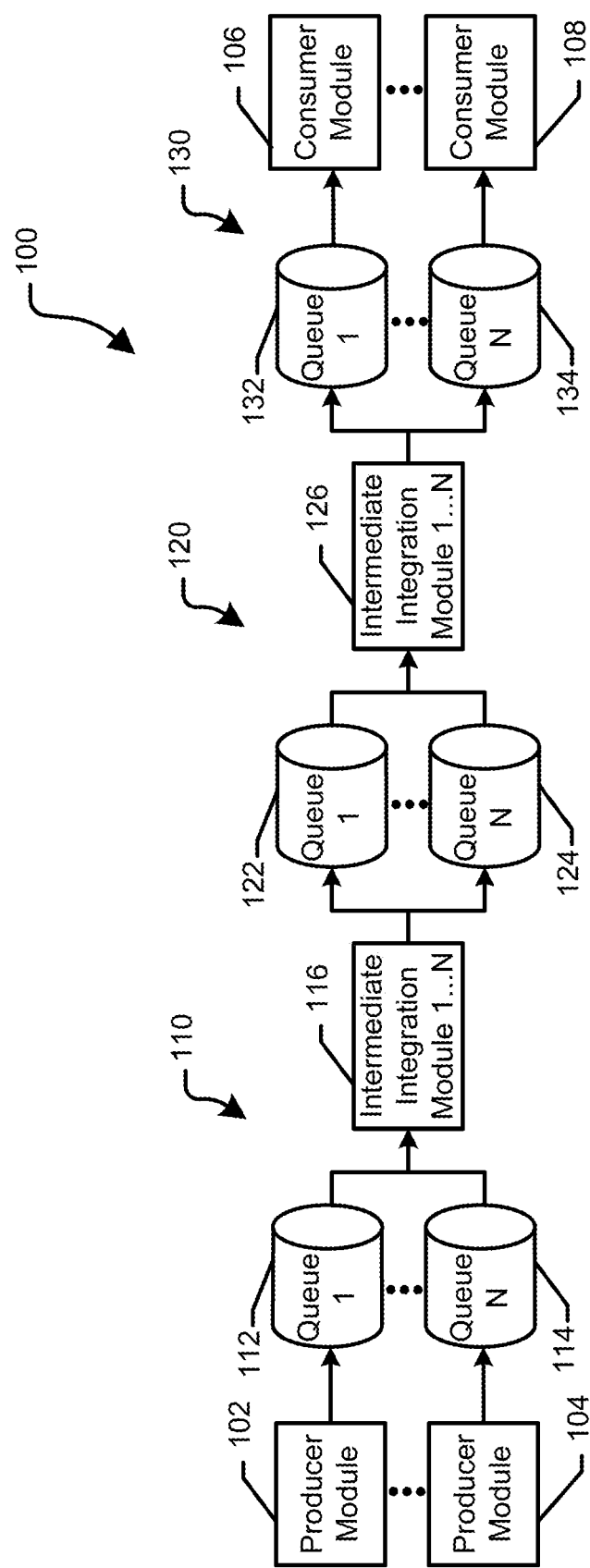
FIG. 1 is a block diagram of one embodiment of an information handling system to deliver messages from multiple producer modules to multiple consumer modules according to an embodiment of the present disclosure.

FIG. 1 is a block diagram of an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer (desktop, laptop, all-in-one computer, etc.), a consumer electronic device, a network server or storage device, a switch router, wireless router, or other network communication device, a network connected device (cellular telephone, tablet device, etc.), or any other suitable device, and can vary in size, shape, performance, price, and functionality and price. The information handling system can also be implemented as or incorporated into various devices, such as a laptop computer, a tablet computer, a set-top box (STB), a mobile information handling system, a palmtop computer, a desktop computer, a communications device, a wireless telephone, a smart phone, a wearable computing device, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system can be implemented using electronic devices that provide voice, video or data communication. Further, while a single information handling system 100 is illustrated in FIG. 1, the term "system" shall also be taken to include any collection of systems or sub-systems that individually or jointly execute a set, or multiple sets, of instructions to perform one or more computer functions.

The information handling system 100 includes multiple producer modules, represented by producer modules 102 and 104, and multiple consumer modules, represented by consumer modules 106 and 108. In an embodiment, the producer modules 102 and 104 can generate messages to be sent to consumer modules 106 and 108 via multiple integration stages 110, 120, and 130. The first integration stage 110 includes multiple queues, represented by queues 112 and 114, and multiple intermediate integration modules, represented by integration module 116. The next integration stage 120 includes multiple queues, represented by queues 122 and 124, and multiple intermediate integration modules, represented by integration module 126. The last integration stage 130 includes multiple queues, represented by queues 132 and 134, and multiple consumer modules, represented by consumer modules 106 and 108. In an embodiment, the term module used herein, such as the producer modules 102 and 104, the consumer modules 106 and 108, and the intermediate integration modules 116 and 126, can be hardware, software, or any combination of hardware and software. For example, a module can be one or more hardware processing devices to execute code and perform one or more of the operations described herein. In an embodiment, the queues 112, 114, 122, 124, 132, and 134 can be implemented via a processor and a memory structure, such as a non-volatile memory. In an embodiment, the processor can receive the messages from another component in the information handling system and can store the messages in the associated memory structure.

During operation, the producer modules 102 and 104 can generate multiple messages and can store the messages in respective queues 112 and 114. For example, the producer modules 102 and 104 can generate purchase tickets in response to a user's interaction with an online e-commerce system, or the like. In an embodiment, the producer modules 102 and 104 can create data messages that include the purchase tickets as the data payload, and these messages can be sent to the consumer modules 106 and 108. When the messages are stored in the queues 112 and 114, the queues can store additional information for the messages, such as an enqueue time, a service level agreement (SLA) delivery time, a producer/sender ID, a consumer ID, and the like. In an embodiment, the producer modules 104 and 106 can assign a SLA delivery time to each generated message, and the SLA delivery time can identify a time that the message needs to arrive at a consumer module 106 or 108 based on one or more SLA criteria of the overall information handling system 100.

In an embodiment, the SLA of the information handling system 100 can define that specific types of messages, such as messages including purchase tickets, need to arrive at the consumer module within a specific amount of time from when the message was generated. For example, the SLA of the information handling system 100 can define that these types of message need to arrive at the consumer module 106 or 108 within ten, fifteen, twenty, or the like minutes from when the messages are generated by the producer module 102 or 104 and stored in the queue 112 or 114.

One or more of the queues 112, 114, 122, 124, 132, and 134, or the integration modules 116 and 126 may fail, go offline, or the like, such that these devices do not process and/or provide the messages to the next device. The other messages in the information handling system 100 can continue to be processed in a normal flow as the messages are received at the different stages 110, 120, and 130 of the information handling system 100. Once the issues affecting the impacted server or device are fixed or repaired, the delayed message can be reprocessed and sent to the next stage of the information handling system 100. However, if the queues 112, 114, 122, 124, 132, and 134 are typical first-in-first-out (FIFO) queues, the delayed messages may be enqueued into the queues behind the other messages. In this situation, the delayed messages may not be delivered to the consumer module 106 or 108 by the SLA delivery time if the impacted server delayed the message by too great of an amount of time. Thus, the queues 112, 114, 122, 124, 132, and 134 can be configured as SLA queues, so that the queues can enqueue and dequeue messages based on one or more SLA criteria to maintain an overall SLA for the entire information handling system 100. For example, the queues 114, 122, 124, 132, and 134 can be configured to enqueue and dequeue messages based on a SLA delivery time for the message as will be described with respect to FIG. 2 below.

Figure 2:
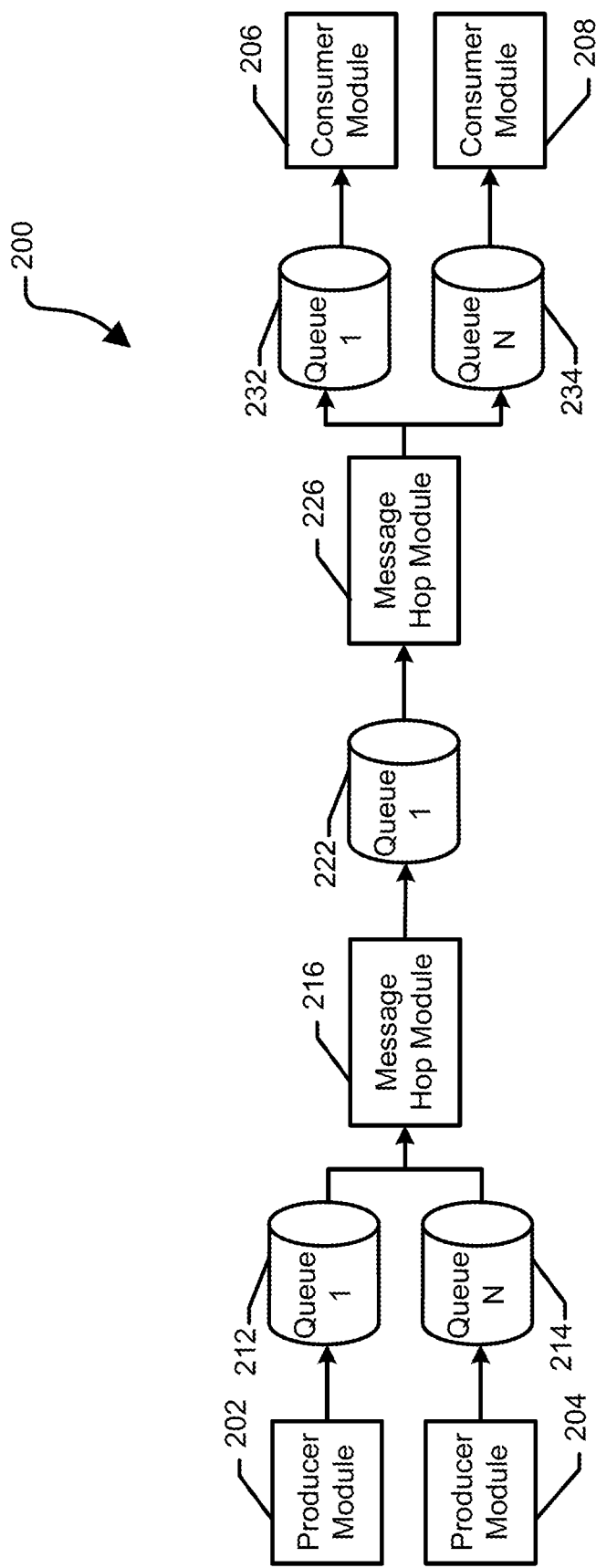
FIG. 2 is a block diagram of another embodiment of an information handling system to deliver messages from multiple producer modules to multiple consumer modules according to an embodiment of the present disclosure.

FIG. 2 shows an information handling system 200 according to an embodiment of the present disclosure. The information handling system 200 includes producer modules 202 and 204, consumer modules 206 and 208, queues 212, 214, 222, 232, and 234, and integration or message hop modules 216 and 226. In an embodiment, the information handling system 200 can include different numbers of producer modules, queues, message hop modules, and consumer modules than shown in FIG. 2. However, for clarity of discussion, the operation of information handling system 200 with be described only with respect to producer modules 202 and 204, consumer modules 206 and 208, queues 212, 214, 222, 232, and 234, and message hop modules 216 and 226.

In a first implementation of the information handling system 200, the queues 212, 214, 222, 232, and 234 can enqueue and dequeue messages based only on arrival times of the messages at the queue. In an embodiment, the producer module 202 can generate two messages to be sent to consumer 206, and can generate two messages to be sent to consumer 208. These messages can then be stored/enqueued into queue 212, such as Msg 1, Msg 2, Msg 3, and Msg 4. When the messages are enqueued into queue 212, additional information, such as the message (Msg) ID, the enqueue (Enq) time, SLA delivery time (SLA Tm), producer ID, recipient ID, or the like, for each message can also be stored as shown in Table 1 below:

TABLE 1

| Queue 212 at 3:00 PM | | | | |
|---|---|---|---|---|
| Msg ID | Enq Tm | SLA Tm | Producer ID | Recipient ID |
| Msg 1 | 3:00 PM | 3:20 PM | Producer 202 | Consumer 206 |
| Msg 2 | 3:00 PM | 3:20 PM | Producer 202 | Consumer 208 |
| Msg 3 | 3:00 PM | 3:20 PM | Producer 202 | Consumer 206 |
| Msg 4 | 3:00 PM | 3:20 PM | Producer 202 | Consumer 208 |

Thus, as shown in Table 1 above, each of the messages can be enqueued into queue 212 at substantially the same time, 3:00 PM, can have the same SLA delivery time, 3:20 PM, and have the producer 202 listed as the producer ID. In an embodiment, messages 1 and 3 can be directed to consumer module 206 and message 2 and 4 can be directed to consumer module 208. One of ordinary skill in the art would recognize that the enqueue times for each of the messages can be different by seconds, tenths of a second, hundredths of a second, or the like, but for simplicity of discussion are all listed as having the same enqueue time. In an embodiment, after the messages are enqueued into queue 212, the queue can go offline, such that the message hop module 216 cannot retrieve any of the messages from queue 212. In an embodiment, queue 212 may be offline for fifteen minutes, and during this time the producer module 204 may generate and enqueue four messages in queue 214 as shown in Table 2 below:

TABLE 2

| Queue 214 at 3:15 PM | | | | |
|---|---|---|---|---|
| Msg ID | Enq Tm | SLA Tm | Producer ID | Recipient ID |
| Msg 11 | 3:15 PM | 3:35 PM | Producer 204 | Consumer 206 |
| Msg 12 | 3:15 PM | 3:35 PM | Producer 204 | Consumer 206 |
| Msg 13 | 3:15 PM | 3:35 PM | Producer 204 | Consumer 208 |
| Msg 14 | 3:15 PM | 3:35 PM | Producer 204 | Consumer 208 |

Table 2 shows the state of queue 214 at a particular point in time, such as 3:15 PM. At this point in time, four message can be located within queue 214 and each of the messages can be enqueued into queue 214 at substantially the same time, 3:15 PM, can have the same SLA delivery time, 3:35 PM, and have the producer 204 listed as the producer ID. In an embodiment, messages 1 and 2 can be directed to consumer module 206 and message 3 and 4 can be directed to consumer module 208.

In an embodiment, the issues associated with queue 212 can be resolved at substantially the same time as producer module 204 stores the messages in queue 214. In this situation, the message hop module 216 can dequeue the messages from both queue 212 and 214 in any manner, such as alternating between queue 214 and 212. The message hop module 216 can then provide the dequeued messages to queue 222. In different embodiments, the amount of time between when the message hop module 216 dequeues a message from queue 212 or 214 until when the same message is enqueued into queue 222 can vary. However, for clarity this amount of time will be defined as a one minute interval for the discussion of FIG. 2. For example, if the message hop module 216 dequeues both message 11 from queue 214 and message 1 from queue 212 at 3:15 PM, messages 11 and 1 will be enqueued into queue 222 at 3:16 PM as shown in Table 3 below:

TABLE 3

| | | Queue 222 at 3:16 PM | | |
|---|---|---|---|---|
| Msg ID | Enq Tm | SLA Tm | Producer ID | Recipient ID |
| Msg 11 | 3:16 PM | 3:35 PM | Producer 204 | Consumer 206 |
| Msg 1 | 3:16 PM | 3:20 PM | Producer 202 | Consumer 206 |

In an embodiment, before a message is enqueued into queue 222 or any other queue, the message can be evaluated with respect to three different qualifications. These qualification can be that the SLA delivery time is prior to the current time, that the SLA delivery time is not less than a delay time for the message, and that the SLA delivery is not greater than an expiration time. In an embodiment, the delay time can identify how long a message is to be delayed at a queue before the message can be provided to the next module or device. In an embodiment, the expiration time can be a time when the message can no longer be delivered. Thus, these comparisons can be made before a message is enqueuer to verify that the message is able to satisfy the different SLA requirements. For clarity of discussion the qualifications that the SLA delivery time is not less than a delay time for the message, and that the SLA delivery is not greater than an expiration time are both assumed to be true.

Messages 11 and 1 can be stored in queue 222 with the enqueue time of 3:16 PM. At a next point in time, 3:17 PM, message hop module 226 can dequeue a first-in-order message from queue 222, such as message 11 shown in Table 3 above, and message hop module 216 can transfer two more messages into queue 222, such as message 12 from queue 214 and message 2 from queue 212 as shown in Table 4 below:

TABLE 4

| | | Queue 222 at 3:17 PM | | |
|---|---|---|---|---|
| Msg ID | Enq Tm | SLA Tm | Producer ID | Recipient ID |
| Msg 1 | 3:16 PM | 3:20 PM | Producer 202 | Consumer 206 |
| Msg 12 | 3:17 PM | 3:35 PM | Producer 204 | Consumer 206 |
| Msg 2 | 3:17 PM | 3:20 PM | Producer 202 | Consumer 208 |

As shown in Table 4 above, message 11 has been dequeued from queue 222 and messages 12 and 2 have been enqueued. In an embodiment, message hop module 226 can transfer message 11 to queue 232 in response to the recipient ID of message 11 identifying consumer module 206. The status of queues 232 and 234 at point in time, 3:17 PM, is illustrated in Table 5 below:

TABLE 5

| | | Queues 232 and 234 at 3:17 PM | | | |
|---|---|---|---|---|---|
| Msg ID | Enq Tm | SLA Tm | Producer ID | Recipient ID | SLA |
| | | Queue 232 | | | |
| Msg 11 | 3:17 PM | 3:35 PM | Producer 204 | Consumer 206 | Passed |
| | | Queue 234 | | | |

When the message 11 is enqueued into queue 232, the message is available for consumer module 206, such that the delivery time to the consumer module is completed. In this situation, message 11 is delivered to consumer module 206 at the enqueue time of 3:17 PM, which is prior to the SLA delivery time, 3:35 PM, for message 11. Thus, the SLA for the delivery time of message 11 can be identified as passed, as shown in Table 5 above.

At a next point in time, 3:18 PM, message hop module 226 can dequeue the current first-in-order message from queue 222, such as message 1 shown in Table 4 above, and message hop module 216 can transfer two more messages into queue 222, such as message 13 from queue 214 and message 3 from queue 212 as shown in Table 6 below:

TABLE 6

| | | Queue 222 at 3:18 PM | | |
|---|---|---|---|---|
| Msg ID | Enq Tm | SLA Tm | Producer ID | Recipient ID |
| Msg 12 | 3:17 PM | 3:35 PM | Producer 204 | Consumer 206 |
| Msg 2 | 3:17 PM | 3:20 PM | Producer 202 | Consumer 208 |
| Msg 13 | 3:18 PM | 3:35 PM | Producer 204 | Consumer 208 |
| Msg 3 | 3:18 PM | 3:20 PM | Producer 202 | Consumer 206 |

As shown in Table 6 above, messages 13 and 3 have been queued after, in terms of order-to-be-dequeued, messages 12 and 2 that having already been enqueued in queue 222. In an embodiment, the new messages are enqueued after the previously queued message based on the queue only using enqueue time as the consideration for enqueueing and dequeueing messages. In an embodiment, message hop module 226 can transfer message 1 to queue 232 in response to the recipient ID of message 1 identifying consumer module 206. The status of queues 232 and 234 at point in time, 3:18 PM, is illustrated in Table 7 below:

TABLE 7

| | | Queues 232 and 234 at 3:18 PM | | | |
|---|---|---|---|---|---|
| Msg ID | Enq Tm | SLA Tm | Producer ID | Recipient ID | SLA |
| | | Queue 232 | | | |
| Msg 11 | 3:17 PM | 3:35 PM | Producer 204 | Consumer 206 | Passed |
| Msg 1 | 3:18 PM | 3:20 PM | Producer 202 | Consumer 206 | Passed |
| | | Queue 234 | | | |

When the message 1 is enqueued into queue 232, the message is available for consumer module 206, such that the delivery time to the consumer module is completed. In this situation, message 1 is delivered to consumer module 206 at the enqueue time of 3:18 PM, which is prior to the SLA delivery time, 3:20 PM, for message 1. Thus, the SLA for the delivery time of message 1 can be identified as passed, as shown in Table 7 above. In an embodiment, the consumer module 206 can retrieve the messages 11 and 1 from queue 232 at any point in time, such that the consumer module 206 being offline does not effect the SLA delivery time of the information handling system 200.

At a next point in time, 3:19 PM, message hop module 226 can dequeue the current first-in-order message from queue 222, such as message 12 shown in Table 6 above, and message hop module 216 can transfer two more messages into queue 222, such as message 14 from queue 214 and message 4 from queue 212, as shown in Table 8 below:

TABLE 8

Queue 222 at 3:19 PM

| Msg ID | Enq Tm | SLA Tm | Producer ID | Recipient ID |
|---|---|---|---|---|
| Msg 2 | 3:17 PM | 3:20 PM | Producer 202 | Consumer 208 |
| Msg 13 | 3:18 PM | 3:35 PM | Producer 204 | Consumer 208 |
| Msg 3 | 3:18 PM | 3:20 PM | Producer 202 | Consumer 206 |
| Msg 14 | 3:19 PM | 3:35 PM | Producer 204 | Consumer 208 |
| Msg 4 | 3:19 PM | 3:20 PM | Producer 202 | Consumer 208 |

As shown in Table 8 above, message 12 has been dequeued from queue 222 and messages 14 and 4 have been enqueued. In an embodiment, message hop module 226 can transfer message 12 to queue 232 in response to the recipient ID of message 12 identifying consumer module 206. The status of queues 232 and 234 at point in time, 3:19 PM, is illustrated in Table 9 below:

TABLE 9

Queues 232 and 234 at 3:19 PM

| Msg ID | Enq Tm | SLA Tm | Producer ID | Recipient ID | SLA |
|---|---|---|---|---|---|
| Queue 232 | | | | | |
| Msg 11 | 3:17 PM | 3:35 PM | Producer 204 | Consumer 206 | Passed |
| Msg 1 | 3:18 PM | 3:20 PM | Producer 202 | Consumer 206 | Passed |
| Msg 12 | 3:19 PM | 3:35 PM | Producer 204 | Consumer 206 | Passed |
| Queue 234 | | | | | |

When the message 12 is enqueued into queue 232, the message is available for consumer module 206, such that the delivery time to the consumer module is completed. In this situation, message 12 is delivered to consumer module 206 at the enqueue time of 3:19 PM, which is prior to the SLA delivery time, 3:35 PM, for message 12. Thus, the SLA for the delivery time of message 12 can be identified as passed, as shown in Table 9 above.

At a next point in time, 3:20 PM, message hop module 226 can dequeue the current first-in-order message from queue 222, such as message 2 shown in Table 8 above, and no more messages remaining in queues 212 and 214 such that the messages left in queue 222 are messages 13, 3, 14, and 4 as shown in Table 10 below:

TABLE 10

Queue 222 at 3:20 PM

| Msg ID | Enq Tm | SLA Tm | Producer ID | Recipient ID |
|---|---|---|---|---|
| Msg 13 | 3:18 PM | 3:35 PM | Producer 204 | Consumer 208 |
| Msg 3 | 3:18 PM | 3:20 PM | Producer 202 | Consumer 206 |
| Msg 14 | 3:19 PM | 3:35 PM | Producer 204 | Consumer 208 |
| Msg 4 | 3:19 PM | 3:20 PM | Producer 202 | Consumer 208 |

In an embodiment, message hop module 226 can transfer message 2 to queue 234 in response to the recipient ID of message 2 identifying consumer module 208. The status of queues 232 and 234 at point in time, 3:20 PM, is illustrated in Table 11 below:

TABLE 11

Queues 232 and 234 at 3:20 PM

| Msg ID | Enq Tm | SLA Tm | Producer ID | Recipient ID | SLA |
|---|---|---|---|---|---|
| Queue 232 | | | | | |
| Msg 11 | 3:17 PM | 3:35 PM | Producer 204 | Consumer 206 | Passed |
| Msg 1 | 3:18 PM | 3:20 PM | Producer 202 | Consumer 206 | Passed |
| Msg 12 | 3:19 PM | 3:35 PM | Producer 204 | Consumer 206 | Passed |
| Queue 234 | | | | | |
| Msg 2 | 3:20 PM | 3:20 PM | Producer 202 | Consumer 208 | Passed |

When the message 2 is enqueued into queue 234, the message is available for consumer module 208, such that the delivery time to the consumer module is completed. In this situation, message 2 is delivered to consumer module 208 at the enqueue time of 3:20 PM, which equal to the SLA delivery time, 3:20 PM, for message 2. Thus, the SLA for the delivery time of message 2 can be identified as passed, as shown in Table 11 above. In an embodiment, the consumer module 208 can retrieve the message 2 from queue 234 at any point in time, such that the consumer module 208 being offline does not effect the SLA delivery time of the information handling system 200.

At a next point in time, 3:21 PM, message hop module 226 can dequeue the current first-in-order message from queue 222, such as message 13 shown in Table 10 above, and message 3, 14, and 4 can remain in queue 222 as shown in Table 12 below:

TABLE 12

Queue 222 at 3:21 PM

| Msg ID | Enq Tm | SLA Tm | Producer ID | Recipient ID |
|---|---|---|---|---|
| Msg 3 | 3:18 PM | 3:20 PM | Producer 202 | Consumer 206 |
| Msg 14 | 3:19 PM | 3:35 PM | Producer 204 | Consumer 208 |
| Msg 4 | 3:19 PM | 3:20 PM | Producer 202 | Consumer 208 |

In an embodiment, message hop module 226 can transfer message 13 to queue 234 in response to the recipient ID of message 13 identifying consumer module 208. The status of queues 232 and 234 at point in time, 3:21 PM, is illustrated in Table 13 below:

TABLE 13

Queues 232 and 234 at 3:21 PM

| Msg ID | Enq Tm | SLA Tm | Producer ID | Recipient ID | SLA |
|---|---|---|---|---|---|
| Queue 232 | | | | | |
| Msg 11 | 3:17 PM | 3:35 PM | Producer 204 | Consumer 206 | Passed |
| Msg 1 | 3:18 PM | 3:20 PM | Producer 202 | Consumer 206 | Passed |
| Msg 12 | 3:19 PM | 3:35 PM | Producer 204 | Consumer 206 | Passed |
| Queue 234 | | | | | |
| Msg 2 | 3:20 PM | 3:20 PM | Producer 202 | Consumer 208 | Passed |
| Msg 13 | 3:21 PM | 3:35 PM | Producer 204 | Consumer 208 | Passed |

When the message 13 is enqueued into queue 234, the message is available for consumer module 208, such that the delivery time to the consumer module is completed. In this situation, message 13 is delivered to consumer module 208 at the enqueue time of 3:21 PM, which is prior to the SLA delivery time, 3:35 PM, for message 13. Thus, the SLA for the delivery time of message 13 can be identified as passed, as shown in Table 13 above.

At a next point in time, 3:22 PM, message hop module 226 can dequeue the next-in-order message from queue 222, such as message 3 shown in Table 12 above, and messages 14 and 4 can remain in queue 222 as shown in Table 14 below:

TABLE 14

Queue 222 at 3:22 PM

| Msg ID | Enq Tm | SLA Tm | Producer ID | Recipient ID |
|---|---|---|---|---|
| Msg 14 | 3:19 PM | 3:35 PM | Producer 204 | Consumer 208 |
| Msg 4 | 3:19 PM | 3:20 PM | Producer 202 | Consumer 208 |

In an embodiment, message hop module 226 can transfer message 3 to queue 232 in response to the recipient ID of message 3 identifying consumer module 206. The status of queues 232 and 234 at point in time, 3:22 PM, is illustrated in Table 15 below:

TABLE 15

Queues 232 and 234 at 3:22 PM

| Msg ID | Enq Tm | SLA Tm | Producer ID | Recipient ID | SLA |
|---|---|---|---|---|---|
| Queue 232 | | | | | |
| Msg 11 | 3:17 PM | 3:35 PM | Producer 204 | Consumer 206 | Passed |
| Msg 1 | 3:18 PM | 3:20 PM | Producer 202 | Consumer 206 | Passed |
| Msg 12 | 3:19 PM | 3:35 PM | Producer 204 | Consumer 206 | Passed |
| Msg 3 | 3:22 PM | 3:20 PM | Producer 202 | Consumer 206 | Missed |
| Queue 234 | | | | | |
| Msg 2 | 3:20 PM | 3:20 PM | Producer 202 | Consumer 208 | Passed |
| Msg 13 | 3:21 PM | 3:35 PM | Producer 204 | Consumer 208 | Passed |

When the message 3 is delivered to queue 232, the delivery time to the consumer module 206 is completed. In this situation, message 3 is delivered to consumer module 206 at the enqueue time of 3:22 PM, which is after the SLA delivery time, 3:20 PM, for message 3. Thus, the SLA for the delivery time of message 3 is missed. In an embodiment, the message 3 is not enqueued into queue 232 based on the SLA delivery time being after the current time, as identified by the enqueue time. In another embodiment message 3 can be stored in queue 232 but can be labeled as the SLA delivery time was missed, as shown in Table 15 above. In an embodiment, the SLA delivery time for a message is missed when the enqueue time for the message is after the SLA delivery time.

At a next point in time, 3:23 PM, message hop module 226 can dequeue the current first-in-order message from queue 222, such as message 14 shown in Table 14 above, and message 4 can be the only remaining message in queue 222 as shown in Table 16 below:

TABLE 16

Queue 222 at 3:23 PM

| Msg ID | Enq Tm | SLA Tm | Producer ID | Recipient ID |
|---|---|---|---|---|
| Msg 4 | 3:19 PM | 3:20 PM | Producer 202 | Consumer 208 |

In an embodiment, message hop module 226 can transfer message 14 to queue 234 in response to the recipient ID of message 14 identifying consumer module 208. The status of queues 232 and 234 at point in time, 3:23 PM, is illustrated in Table 17 below:

TABLE 17

Queues 232 and 234 at 3:23 PM

| Msg ID | Enq Tm | SLA Tm | Producer ID | Recipient ID | SLA |
|---|---|---|---|---|---|
| Queue 232 | | | | | |
| Msg 11 | 3:17 PM | 3:35 PM | Producer 204 | Consumer 206 | Passed |
| Msg 1 | 3:18 PM | 3:20 PM | Producer 202 | Consumer 206 | Passed |
| Msg 12 | 3:19 PM | 3:35 PM | Producer 204 | Consumer 206 | Passed |
| Msg 3 | 3:22 PM | 3:20 PM | Producer 202 | Consumer 206 | Missed |
| Queue 234 | | | | | |
| Msg 2 | 3:20 PM | 3:20 PM | Producer 202 | Consumer 208 | Passed |
| Msg 13 | 3:21 PM | 3:35 PM | Producer 204 | Consumer 208 | Passed |
| Msg 14 | 3:23 PM | 3:35 PM | Producer 204 | Consumer 208 | Passed |

When the message 14 is enqueued into queue 234, the message is available for consumer module 208, such that the delivery time to the consumer module is completed. In this situation, message 14 is delivered to consumer module 208 at the enqueue time of 3:23 PM, which is prior to the SLA delivery time, 3:35 PM, for message 14. Thus, the SLA for the delivery time of message 14 can be identified as passed, as shown in Table 17 above.

At a next point in time, 3:24 PM, message hop module 226 can dequeue the current first-in-order message from queue 222, such as message 4 shown in Table 16 above, such that all of the messages have been dequeued from queue 222 as shown in Table 18 below:

TABLE 18

Queue 222 at 3:24 PM

| Msg ID | Enq Tm | SLA Tm | Producer ID | Recipient ID |
|---|---|---|---|---|

In an embodiment, message hop module 226 can transfer message 4 to queue 234 in response to the recipient ID of message 4 identifying consumer module 208. The status of queues 232 and 234 at point in time, 3:18 PM, is illustrated in Table 19 below:

TABLE 19

Queues 232 and 234 at 3:24 PM

| Msg ID | Enq Tm | SLA Tm | Producer ID | Recipient ID | SLA |
|---|---|---|---|---|---|
| Queue 232 | | | | | |
| Msg 11 | 3:17 PM | 3:35 PM | Producer 204 | Consumer 206 | Passed |
| Msg 1 | 3:18 PM | 3:20 PM | Producer 202 | Consumer 206 | Passed |
| Msg 12 | 3:19 PM | 3:35 PM | Producer 204 | Consumer 206 | Passed |
| Msg 3 | 3:22 PM | 3:20 PM | Producer 202 | Consumer 206 | Missed |
| Queue 234 | | | | | |
| Msg 2 | 3:20 PM | 3:20 PM | Producer 202 | Consumer 208 | Passed |
| Msg 13 | 3:21 PM | 3:35 PM | Producer 204 | Consumer 208 | Passed |
| Msg 14 | 3:23 PM | 3:35 PM | Producer 204 | Consumer 208 | Passed |
| Msg 4 | 3:24 PM | 3:20 PM | Producer 202 | Consumer 208 | Missed |

When the message 4 is enqueued into queue 234, the message is available for consumer module 208, such that the delivery time to the consumer module is completed. In this situation, message 4 is delivered to consumer module 208 at the enqueue time of 3:24 PM, which is after the SLA delivery time, 3:20 PM, for message 4. Thus, the SLA for the delivery time of message 4 can be identified as being missed, as shown in Table 19 above.

Thus, in this implementation of enqueueing messages within queue 222 based only on when the message arrives at queue 222, and dequeueing the messages only based on the enqueue time can result in 25% of the messages not meeting the SLA delivery time in response to a delay being introduced by queue 112 being down for fifteen minutes.

In an second implementation of the devices within information handling system 200, the queues 212, 214, 222, 232, and 234 can enqueue and dequeue messages based one or more SLA criteria, such as SLA delivery time, recipient, priority, delay, expiration, correlation ID, time, or the like. In an embodiment, the SLA for the information handling system 200 can include a hierarchal order for utilizing the SLA criteria or properties of a message to enqueue or dequeue messages. In an embodiment, the hierarchal order can be priority, SLA delivery time, recipient, producer, delay, correlation ID, expiration, and time. If the highest priority SLA criterion is substantially equal for two or more messages, the decision of what message to enqueue or dequeue can be made by comparing the next SLA criterion in the hierarchal order. For example, if the SLA delivery time is the same for all messages, the next SLA criteria compared can be the recipient of the messages. The description of FIG. 2, for this implementation of information handling system 200, will be discussed with respect to enqueueing and dequeuing messages will based on the SLA delivery time of the messages.

In an embodiment, the producer module 202 can generate two messages to be sent to consumer 206, and can generate two messages to be sent to consumer 208. These messages can then be stored/enqueued into queue 212, such as Msg 1, Msg 2, Msg 3, and Msg 4. When the messages are enqueued into queue 212, additional information, such as the Msg ID, the Enq time, SLA delivery time, producer ID, recipient ID, or the like, for each message can also be stored as shown in Table 1 below:

TABLE 20

Queue 212 at 3:00 PM

| Msg ID | Enq Tm | SLA Tm | Producer ID | Recipient ID |
|---|---|---|---|---|
| Msg 1 | 3:00 PM | 3:20 PM | Producer 202 | Consumer 206 |
| Msg 2 | 3:00 PM | 3:20 PM | Producer 202 | Consumer 208 |
| Msg 3 | 3:00 PM | 3:20 PM | Producer 202 | Consumer 206 |
| Msg 4 | 3:00 PM | 3:20 PM | Producer 202 | Consumer 208 |

Thus, as shown in Table 20 above, each of the messages can be enqueued into queue 212 at substantially the same time, 3:00 PM, can have the same SLA delivery time, 3:20 PM, and have the producer 202 listed as the producer ID. In an embodiment, messages 1 and 3 can be directed to consumer module 206 and message 2 and 4 can be directed to consumer module 208. In an embodiment, after the messages are enqueued into queue 212, the queue can go offline, such that the message hop module 216 cannot retrieve any of the messages from queue 212. In an embodiment, queue 212 may be offline for fifteen minutes, and during this time the producer module 204 may generate and enqueue four messages in queue 214 as shown in Table 21 below:

TABLE 21

Queue 214 at 3:15 PM

| Msg ID | Enq Tm | SLA Tm | Producer ID | Recipient ID |
|---|---|---|---|---|
| Msg 11 | 3:15 PM | 3:35 PM | Producer 204 | Consumer 206 |
| Msg 12 | 3:15 PM | 3:35 PM | Producer 204 | Consumer 206 |
| Msg 13 | 3:15 PM | 3:35 PM | Producer 204 | Consumer 208 |
| Msg 14 | 3:15 PM | 3:35 PM | Producer 204 | Consumer 208 |

Table 21 can show the state of queue 214 at a particular point in time, such as 3:15 PM. At this point in time, four message can be located within queue 214 and each of the messages can be enqueued into queue 214 at substantially the same time, 3:15 PM, can have the same SLA delivery time, 3:35 PM, and have the producer 204 listed as the producer ID. In an embodiment, messages 1 and 2 can be directed to consumer module 206 and message 3 and 4 can be directed to consumer module 208.

In an embodiment, the issues associated with queue 212 can be resolved at substantially the same time as producer module 204 enqueues the messages in queue 214. In this situation, the message hop module 216 can dequeue the messages from queues 212 and 214 in any manner, such as alternating between queue 214 and 212. The message hop module 216 can then provide the dequeued messages to queue 222. In an embodiment, the amount of time between when a message hop module dequeues a message from a queue until when the same message is enqueued into the next queue can be a one minute. For example, if the message hop module 216 dequeues both message 11 from queue 214 and message 1 from queue 212 at 3:15 PM, messages 11 and 1 will be enqueued into queue 222 at 3:16 PM as shown in Table 22 below:

TABLE 22

Queue 222 at 3:16 PM

| Msg ID | Enq Tm | SLA Tm | Producer ID | Recipient ID |
|---|---|---|---|---|
| Msg 1 | 3:16 PM | 3:20 PM | Producer 202 | Consumer 206 |
| Msg 11 | 3:16 PM | 3:35 PM | Producer 204 | Consumer 206 |

In this embodiment, the messages can be enqueued into queue 222 based on the arrival time of the messages. For example, if messages 11 and 1 arrival at queue 222 at substantially the same time, such as 3:16 PM, both messages 11 and 1 can be enqueued at substantially the same time and provided with the same enqueue time of 3:16 PM. However, the SLA delivery time for messages 11 and 1 can be used to determine which message will be the first-in-order message to be dequeued from queue 222 even though both messages have the same enqueue time of 3:16 PM. Thus, message 1 can be the first-in-order message for dequeue within queue 222 based on message 1 having a SLA delivery time of 3:20 PM and message 11 having a SLA delivery time of 3:35 PM. At a next point in time, 3:17 PM, message hop module 226 can dequeue the first-in-order message from queue 222, such as message 1 shown in Table 22 above, and message hop module 216 can transfer two more messages into queue 222, such as message 12 from queue 214 and message 2 from queue 212 as shown in Table 23 below:

TABLE 23

Queue 222 at 3:17 PM

| Msg ID | Enq Tm | SLA Tm | Producer ID | Recipient ID |
|---|---|---|---|---|
| Msg 2 | 3:17 PM | 3:20 PM | Producer 202 | Consumer 208 |
| Msg 11 | 3:16 PM | 3:35 PM | Producer 204 | Consumer 206 |
| Msg 12 | 3:17 PM | 3:35 PM | Producer 204 | Consumer 206 |

As shown in Table 23 above, message 1 has been dequeued from queue 222 and messages 12 and 2 have been enqueued. In an embodiment, message 2 can be placed in dequeuer order prior to messages 11 and 12, such that message 2 is identified as the first-in-order message in queue 222, based on message 2 having an earlier SLA delivery time than messages 11 and 12. The SLA delivery times for messages 11 and 12 can then be compared to determine which of these two messages to place next in the dequeuer order. However, the SLA delivery times for messages 11 and 12 can be substantially similar. Therefore, the determination of which message to dequeue can go to the next SLA property in the hierarchal order of SLA properties, such as enqueue time. In this embodiment, message 11 was enqueued in queue 222 before message 12, such that message 11 arrived before message 12. Therefore, message 11 is the next-in-order message after message 2 in queue 222 as shown in Table 23 above. In an embodiment, message hop module 226 can transfer message 1 to queue 232 in response to the recipient ID of message 1 identifying consumer module 206. The status of queues 232 and 234 at point in time, 3:17 PM, is illustrated in Table 24 below:

TABLE 24

Queues 232 and 234 at 3:17 PM

| Msg ID | Enq Tm | SLA Tm | Producer ID | Recipient ID | SLA |
|---|---|---|---|---|---|
| Queue 232 | | | | | |
| Msg 1 | 3:17 PM | 3:20 PM | Producer 202 | Consumer 206 | Passed |
| Queue 234 | | | | | |

When the message 1 is enqueued into queue 232, the message is available for consumer module 206, such that the delivery time to the consumer module is completed. In this situation, message 1 is delivered to consumer module 206 at the enqueue time of 3:17 PM, which is prior to the SLA delivery time, 3:20 PM, for message 1. Thus, the SLA for the delivery time of message 1 can be identified as passed, as shown in Table 24 above.

At a next point in time, 3:18 PM, message hop module 226 can dequeue the current first-in-order message from queue 222, such as message 2 shown in Table 23 above, and message hop module 216 can transfer two more messages into queue 222, such as message 13 from queue 214 and message 3 from queue 212. In an embodiment, message 3 can be placed in dequeuer order prior to messages 11, 12, and 13, such that message 3 is identified as the first-in-order message in queue 222, based on message 3 having an earlier SLA delivery time as shown in Table 25 below:

TABLE 25

Queue 222 at 3:18 PM

| Msg ID | Enq Tm | SLA Tm | Producer ID | Recipient ID |
|---|---|---|---|---|
| Msg 3 | 3:18 PM | 3:20 PM | Producer 202 | Consumer 206 |
| Msg 11 | 3:16 PM | 3:35 PM | Producer 204 | Consumer 206 |
| Msg 12 | 3:17 PM | 3:35 PM | Producer 204 | Consumer 206 |
| Msg 13 | 3:18 PM | 3:35 PM | Producer 204 | Consumer 208 |

As shown in Table 25 above, the SLA delivery times for messages 11, 12, and 13 can then be compared to determine which of these messages to place next in dequeue order. However, the SLA delivery times for messages 11, 12, and 13 can be substantially similar. Therefore, the determination of which message to place as the next-in-order message can go to the next SLA property in the hierarchal order of SLA properties, such as enqueue time. In this embodiment, message 11 was enqueued in queue 222 before message 12, which in turn was enqueued prior to message 13. Therefore, message 11 is the next-in-order message after message 3 in queue 222, followed by message 12, and finally message 13 as shown in Table 25 above. In an embodiment, message hop module 226 can transfer message 2 to queue 234 in response to the recipient ID of message 2 identifying consumer module 208. The status of queues 232 and 234 at point in time, 3:18 PM, is illustrated in Table 26 below:

TABLE 26

Queues 232 and 234 at 3:18 PM

| Msg ID | Enq Tm | SLA Tm | Producer ID | Recipient ID | SLA |
|---|---|---|---|---|---|
| Queue 232 | | | | | |
| Msg 1 | 3:17 PM | 3:20 PM | Producer 202 | Consumer 206 | Passed |
| Queue 234 | | | | | |
| Msg 2 | 3:18 PM | 3:20 PM | Producer 202 | Consumer 208 | Passed |

When the message 2 is enqueued into queue 234, the message is available for consumer module 208, such that the delivery time to the consumer module is completed. In this situation, message 2 is delivered to consumer module 208 at the enqueue time of 3:18 PM, which is prior to the SLA delivery time, 3:20 PM, for message 2. Thus, the SLA for the delivery time of message 2 can be identified as passed, as shown in Table 26 above.

At a next point in time, 3:19 PM, message hop module 226 can dequeue the current first-in-order message from queue 222, such as message 3 shown in Table 25 above, and message hop module 216 can transfer two more messages into queue 222, such as message 14 from queue 214 and message 4 from queue 212. In an embodiment, message 4 can be placed in dequeuer order prior to messages 11, 12, 13, and 14, such that message 4 is identified as the first-in-order message in queue 222, based on message 4 having an earlier SLA delivery time as shown in Table 27 below:

TABLE 27

Queue 222 at 3:19 PM

| Msg ID | Enq Tm | SLA Tm | Producer ID | Recipient ID |
|---|---|---|---|---|
| Msg 4 | 3:19 PM | 3:20 PM | Producer 202 | Consumer 208 |
| Msg 11 | 3:16 PM | 3:35 PM | Producer 204 | Consumer 206 |
| Msg 12 | 3:17 PM | 3:35 PM | Producer 204 | Consumer 206 |
| Msg 13 | 3:18 PM | 3:35 PM | Producer 204 | Consumer 208 |
| Msg 14 | 3:19 PM | 3:35 PM | Producer 204 | Consumer 208 |

As shown in Table 27 above, the SLA delivery time for message 14 can be compared with the SLA delivery times for messages 11, 12, and 13, which have already been placed in dequeue order between themselves. However, the SLA delivery time for message 14 can be substantially similar to the SLA delivery times for messages 11, 12, and 13. Therefore, the determination of where to place message 14 in the dequeuer order can go to the next SLA property in the hierarchal order of SLA properties, such as enqueue time. In this embodiment, message 14 was enqueued in queue 222 after messages 11, 12, and 13. Therefore, message 11 is the next-in-order message after message 3 in queue 222, followed by message 12, then message 13, and finally message 14 as shown in Table 27 above. In an embodiment, message hop module 226 can transfer message 3 to queue 232 in response to the recipient ID of message 3 identifying consumer module 206. The status of queues 232 and 234 at point in time, 3:19 PM, is illustrated in Table 28 below:

TABLE 28

Queues 232 and 234 at 3:19 PM

| Msg ID | Enq Tm | SLA Tm | Producer ID | Recipient ID | SLA |
|---|---|---|---|---|---|
| Queue 232 | | | | | |
| Msg 1 | 3:17 PM | 3:20 PM | Producer 202 | Consumer 206 | Passed |
| Msg 3 | 3:19 PM | 3:20 PM | Producer 202 | Consumer 206 | Passed |
| Queue 234 | | | | | |
| Msg 2 | 3:18 PM | 3:20 PM | Producer 202 | Consumer 208 | Passed |

When the message 3 is enqueued into queue 232, the message is available for consumer module 206, such that the delivery time to the consumer module is completed. In this situation, message 3 is delivered to consumer module 206 at the enqueue time of 3:19 PM, which is prior to the SLA delivery time, 3:20 PM, for message 3. Thus, the SLA for the delivery time of message 3 can be identified as passed, as shown in Table 28 above.

At a next point in time, 3:20 PM, message hop module 226 can dequeue the first-in-order message from queue 222, such as message 4 shown in Table 27 above, such that messages 11-14 are left in queue 222 as shown in Table 29 below:

TABLE 29

Queue 222 at 3:20 PM

| Msg ID | Enq Tm | SLA Tm | Producer ID | Recipient ID |
|---|---|---|---|---|
| Msg 11 | 3:16 PM | 3:35 PM | Producer 204 | Consumer 206 |
| Msg 12 | 3:17 PM | 3:35 PM | Producer 204 | Consumer 206 |

TABLE 29-continued

Queue 222 at 3:20 PM

| Msg ID | Enq Tm | SLA Tm | Producer ID | Recipient ID |
|---|---|---|---|---|
| Msg 13 | 3:18 PM | 3:35 PM | Producer 204 | Consumer 208 |
| Msg 14 | 3:19 PM | 3:35 PM | Producer 204 | Consumer 208 |

In an embodiment, message hop module 226 can transfer message 4 to queue 234 in response to the recipient ID of message 4 identifying consumer module 208. The status of queues 232 and 234 at point in time, 3:20 PM, is illustrated in Table 30 below:

TABLE 30

Queues 232 and 234 at 3:20 PM

| Msg ID | Enq Tm | SLA Tm | Producer ID | Recipient ID | SLA |
|---|---|---|---|---|---|
| Queue 232 | | | | | |
| Msg 1 | 3:17 PM | 3:20 PM | Producer 202 | Consumer 206 | Passed |
| Msg 3 | 3:19 PM | 3:20 PM | Producer 202 | Consumer 206 | Passed |
| Queue 234 | | | | | |
| Msg 2 | 3:18 PM | 3:20 PM | Producer 202 | Consumer 208 | Passed |
| Msg 4 | 3:20 PM | 3:20 PM | Producer 202 | Consumer 208 | Passed |

When the message 4 is enqueued into queue 234, the message is available for consumer module 208, such that the delivery time to the consumer module is completed. In this situation, message 4 is delivered to consumer module 208 at the enqueue time of 3:20 PM, which is the SLA delivery time, 3:20 PM, for message 4. Thus, the SLA for the delivery time of message 4 can be identified as passed as shown in Table 30 above.

At a next point in time, 3:21 PM, message hop module 226 can dequeue the first-in-order message from queue 222, such as message 11 shown in Table 29 above, such that messages 12-14 are left in queue 222 as shown in Table 31 below:

TABLE 31

Queue 222 at 3:21 PM

| Msg ID | Enq Tm | SLA Tm | Producer ID | Recipient ID |
|---|---|---|---|---|
| Msg 12 | 3:17 PM | 3:35 PM | Producer 204 | Consumer 206 |
| Msg 13 | 3:18 PM | 3:35 PM | Producer 204 | Consumer 208 |
| Msg 14 | 3:19 PM | 3:35 PM | Producer 204 | Consumer 208 |

In an embodiment, message hop module 226 can transfer message 11 to queue 232 in response to the recipient ID of message 11 identifying consumer module 206. The status of queues 232 and 234 at point in time, 3:21 PM, is illustrated in Table 32 below:

TABLE 32

Queues 232 and 234 at 3:21 PM

| Msg ID | Enq Tm | SLA Tm | Producer ID | Recipient ID | SLA |
|---|---|---|---|---|---|
| Queue 232 | | | | | |
| Msg 1 | 3:17 PM | 3:20 PM | Producer 202 | Consumer 206 | Passed |
| Msg 3 | 3:19 PM | 3:20 PM | Producer 202 | Consumer 206 | Passed |

TABLE 32-continued

Queues 232 and 234 at 3:21 PM

| Msg ID | Enq Tm | SLA Tm | Producer ID | Recipient ID | SLA |
|---|---|---|---|---|---|
| Msg 11 | 3:21 PM | 3:35 PM | Producer 204 | Consumer 206 | Passed |
| Queue 234 | | | | | |
| Msg 2 | 3:18 PM | 3:20 PM | Producer 202 | Consumer 208 | Passed |
| Msg 4 | 3:20 PM | 3:20 PM | Producer 202 | Consumer 208 | Passed |

When the message 11 is enqueued into queue 232, the message is available for consumer module 206, such that the delivery time to the consumer module is completed. In this situation, message 11 is delivered to consumer module 206 at the enqueue time of 3:21 PM, which is prior to the SLA delivery time, 3:35 PM, for message 11. Thus, the SLA for the delivery time of message 11 can be identified as passed, as shown in Table 32 above.

At a next point in time, 3:22 PM, message hop module 226 can dequeue the current first-in-order message from queue 222, such as message 12 shown in Table 29 above, such that messages 13 and 14 are left in queue 222 as shown in Table 33 below:

TABLE 33

Queue 222 at 3:22 PM

| Msg ID | Enq Tm | SLA Tm | Producer ID | Recipient ID |
|---|---|---|---|---|
| Msg 13 | 3:18 PM | 3:35 PM | Producer 204 | Consumer 208 |
| Msg 14 | 3:19 PM | 3:35 PM | Producer 204 | Consumer 208 |

In an embodiment, message hop module 226 can transfer message 12 to queue 232 in response to the recipient ID of message 12 identifying consumer module 206. The status of queues 232 and 234 at point in time, 3:18 PM, is illustrated in Table 34 below:

TABLE 34

Queues 232 and 234 at 3:22 PM

| Msg ID | Enq Tm | SLA Tm | Producer ID | Recipient ID | SLA |
|---|---|---|---|---|---|
| Queue 232 | | | | | |
| Msg 1 | 3:17 PM | 3:20 PM | Producer 202 | Consumer 206 | Passed |
| Msg 3 | 3:19 PM | 3:20 PM | Producer 202 | Consumer 206 | Passed |
| Msg 11 | 3:21 PM | 3:35 PM | Producer 204 | Consumer 206 | Passed |
| Msg 12 | 3:22 PM | 3:35 PM | Producer 204 | Consumer 206 | Passed |
| Queue 234 | | | | | |
| Msg 2 | 3:18 PM | 3:20 PM | Producer 202 | Consumer 208 | Passed |
| Msg 4 | 3:20 PM | 3:20 PM | Producer 202 | Consumer 208 | Passed |

When the message 12 is enqueued into queue 232, the message is available for consumer module 206, such that the delivery time to the consumer module is completed. In this situation, message 12 is delivered to consumer module 206 at the enqueue time of 3:22 PM, which is prior to the SLA delivery time, 3:35 PM, for message 12. Thus, the SLA for the delivery time of message 12 can be identified as passed, as shown in Table 34 above.

At a next point in time, 3:23 PM, message hop module 226 can dequeue the current first-in-order message from queue 222, such as message 13 shown in Table 33 above, such that only message 14 is left in queue 222 as shown in Table 35 below:

TABLE 35

Queue 222 at 3:23 PM

| Msg ID | Enq Tm | SLA Tm | Producer ID | Recipient ID |
|---|---|---|---|---|
| Msg 14 | 3:19 PM | 3:35 PM | Producer 204 | Consumer 208 |

In an embodiment, message hop module 226 can transfer message 13 to queue 234 in response to the recipient ID of message 13 identifying consumer module 208. The status of queues 232 and 234 at point in time, 3:23 PM, is illustrated in Table 36 below:

TABLE 36

Queues 232 and 234 at 3:23 PM

| Msg ID | Enq Tm | SLA Tm | Producer ID | Recipient ID | SLA |
|---|---|---|---|---|---|
| Queue 232 | | | | | |
| Msg 1 | 3:17 PM | 3:20 PM | Producer 202 | Consumer 206 | Passed |
| Msg 3 | 3:19 PM | 3:20 PM | Producer 202 | Consumer 206 | Passed |
| Msg 11 | 3:21 PM | 3:35 PM | Producer 204 | Consumer 206 | Passed |
| Msg 12 | 3:22 PM | 3:35 PM | Producer 204 | Consumer 206 | Passed |
| Queue 234 | | | | | |
| Msg 2 | 3:18 PM | 3:20 PM | Producer 202 | Consumer 208 | Passed |
| Msg 4 | 3:20 PM | 3:20 PM | Producer 202 | Consumer 208 | Passed |
| Msg 13 | 3:23 PM | 3:35 PM | Producer 204 | Consumer 208 | Passed |

When the message 13 is enqueued into queue 234, the message is available for consumer module 208, such that the delivery time to the consumer module is completed. In this situation, message 13 is delivered to consumer module 208 at the enqueue time of 3:23 PM, which is prior to the SLA delivery time, 3:35 PM, for message 13. Thus, the SLA for the delivery time of message 13 can be identified as passed, as shown in Table 36 above.

At a next point in time, 3:24 PM, message hop module 226 can dequeue the first-in-order message from queue 222, such as message 14 shown in Table 35 above, such that no messages remain in queue 222 as shown in Table 37 below:

TABLE 37

Queue 222 at 3:24 PM

| Msg ID | Enq Tm | SLA Tm | Producer ID | Recipient ID |
|---|---|---|---|---|

In an embodiment, message hop module 226 can transfer message 14 to queue 234 in response to the recipient ID of message 14 identifying consumer module 208. The status of queues 232 and 234 at point in time, 3:18 PM, is illustrated in Table 38 below:

TABLE 38

Queues 232 and 234 at 3:24 PM

| Msg ID | Enq Tm | SLA Tm | Producer ID | Recipient ID | SLA |
|---|---|---|---|---|---|
| Queue 232 | | | | | |
| Msg 1 | 3:17 PM | 3:20 PM | Producer 202 | Consumer 206 | Passed |
| Msg 3 | 3:19 PM | 3:20 PM | Producer 202 | Consumer 206 | Passed |
| Msg 11 | 3:21 PM | 3:35 PM | Producer 204 | Consumer 206 | Passed |
| Msg 12 | 3:22 PM | 3:35 PM | Producer 204 | Consumer 206 | Passed |
| Queue 234 | | | | | |
| Msg 2 | 3:18 PM | 3:20 PM | Producer 202 | Consumer 208 | Passed |
| Msg 4 | 3:20 PM | 3:20 PM | Producer 202 | Consumer 208 | Passed |
| Msg 13 | 3:23 PM | 3:35 PM | Producer 204 | Consumer 208 | Passed |
| Msg 14 | 3:24 PM | 3:35 PM | Producer 204 | Consumer 208 | Passed |

When the message 14 is enqueued into queue 234, the message is available for consumer module 208, such that the delivery time to the consumer module is completed. In this situation, message 14 is delivered to consumer module 208 at the enqueue time of 3:24 PM, which is prior to the SLA delivery time, 3:35 PM, for message 14. Thus, the SLA for the delivery time of message 14 can be identified as passed, as shown in Table 38 above.

Thus, in this implementation of enqueueing messages based on the SLA delivery time, the delay introduced to messages 1-4 in response to queue 212 being offline for fifteen minutes did not cause any messages to miss the SLA delivery time. In different embodiments, different properties for the message can be utilized during the dequeue process. For example, the properties can be priority, SLA delivery time, message identification (ID) sequence number, and correlation ID.

In an embodiment, the recipient for a message identifies a certain recipient or consumer module to perform one or more operations of the message. In an embodiment, the message hop modules can request then next-in-order message associated with a particular recipient or consumer. In some embodiments the priority SLA delivery can be placed above the SLA delivery time in the hierarchal order. In an embodiment the delay property, when set, can allow the message to be dequeued only after a specific delay time has expired. For example, if delay is set to 15 minutes, then the message will be allowed to be dequeued only after 15 mins. In an embodiment, if message_enqueue_time+delay<SLA delivery time the message can be enqueued into the queue, otherwise the message is not be enqueued. In an embodiment, the expiration property sets a time that if the message is not dequeued from the queue by that time, then the message can be automatically moved to error queue. The correlation ID can allow recipients or consumer modules to dequeue a specific message. The message ID sequence number can identify the order of a message within a sequence of messages and this can be utilized in dequeuing a message to ensure that the messages are delivered to a consumer in a proper order.

Figure 3:
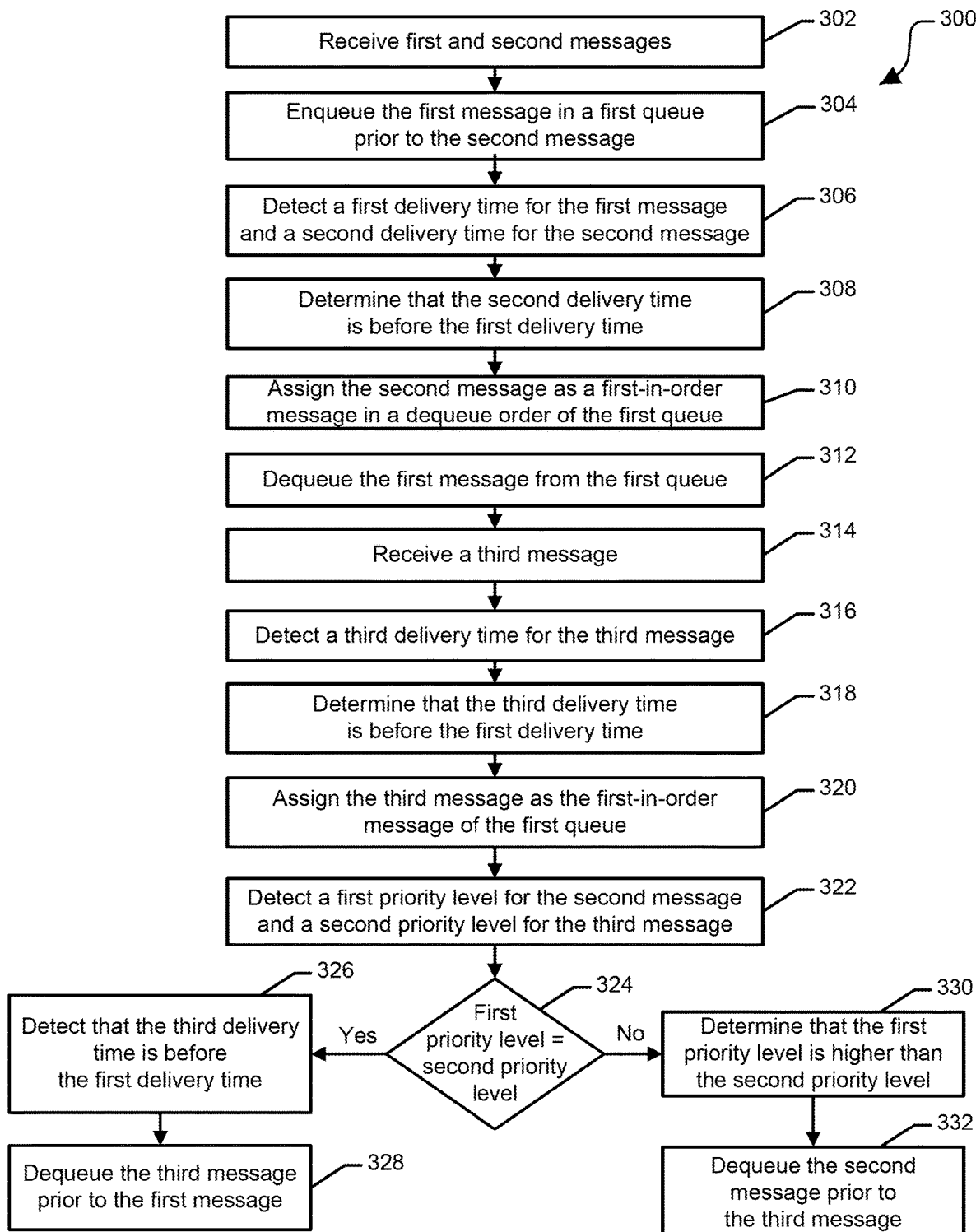
FIG. 3 is a flow diagram illustrating a method for optimizing queueing based on service level agreements according to an embodiment of the present disclosure.

FIG. 3 shows a flow diagram of a method 300 for optimizing queueing of messages in an information handling system according to an embodiment of the present disclosure. At block 302, first and second messages are received. In an embodiment, the first message is sent from a first provider module and the second message is sent from a second provider module. At block 304, the first message is enqueued into a first queue prior to the second message in response to the first message being received at the first queue prior to the second message being received at the first queue. A first delivery time for the first message and a second delivery time for the second message are detected at block 306. At block 308, a determination is made that the second delivery time is before the first delivery time. The second message is placed as a first-in-order message of a dequeue order of the first queue in response to the second delivery time being prior to the first delivery queue at block 310. In an embodiment, the first queue is a service level agreement first-in first-out queue. In an embodiment, placing or assigning the second message as a first-in-order message indicates that the second message is to be dequeued prior to the first message.

At block 312, the second message is dequeued from the first queue in response to the second message being assigned as the first-in-order message. A third message is received at block 314. At block 316, a third delivery time for the third message is detected. A determination is made at block 318 that the third delivery time is before the first delivery time. At block 320, the third message is assigned as the first-in-order message of the dequeue order in the first queue in response to the third delivery time being before the first delivery time. A first priority level of the first message, and a second priority level of third second message are identified at block 322. At block 324, a determination is made whether the first priority level and the second priority level are equal.

If the priority levels are equal the flow continues at block 326, otherwise the flow continues at block 330 and a determination is made that the first priority level is higher than the second priority level. At block 326, a determination is made that the third delivery time is before the first delivery time. At block 328, the third message is dequeued from the first queue prior to the first message in response to the third delivery time being before the first delivery time. At block 332, the first message is dequeued before the third message in response to the first priority level being higher than the second priority level.

Figure 4:
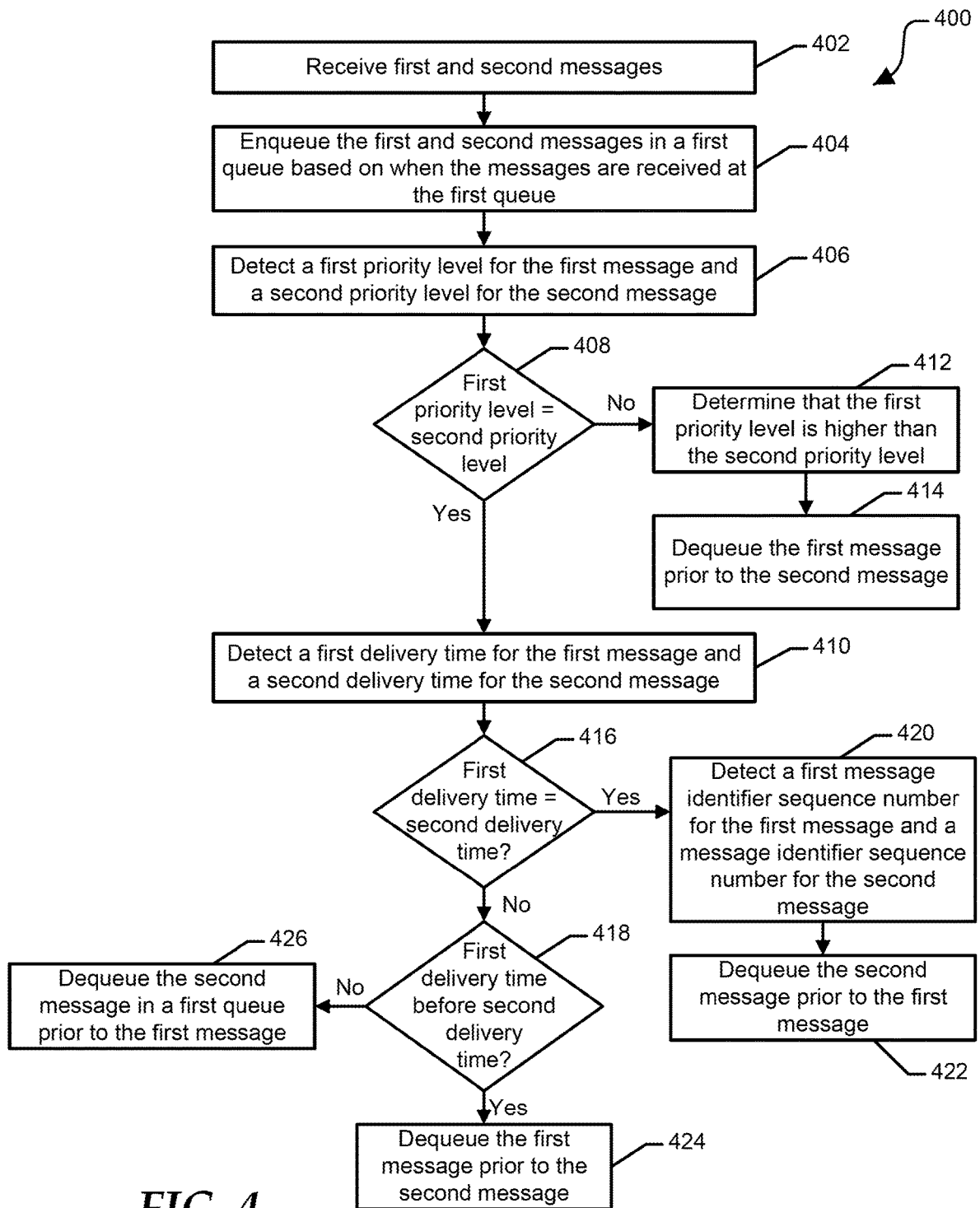
FIG. 4 is a flow diagram illustrating another method for optimizing queueing based on service level agreements according to an embodiment of the disclosure.

FIG. 4 illustrates a flow diagram of a method 400 for optimizing queueing based on service level agreements according to an embodiment of the disclosure. At block 402, first and second messages are received. In an embodiment, the first message is sent from a first provider module and the second message is sent from a second provider module. In an embodiment, the integration module of FIG. 1 can receive the first and second message from the first and second messages. A first priority level of the first message, and a second priority level of the second message are identified at block 406. At block 408, a determination is made whether the first priority level and the second priority level are equal. If the priority levels are equal the flow continues at block 410, otherwise the flow continues at block 412 and a determination is made that the first priority level is higher than the second priority level. At block 414, the first message is dequeued prior to the second message in response to determining that the first delivery time is before the second delivery.

At block 410, first delivery time for the first message and a second delivery time for the second message are detected. At block 416, a determination is made whether the first delivery time is substantially equal to the second delivery time. If not, the flow continues at block 418, otherwise the flow continues at block 420 at which a first message identifier sequence number for the first message and a second message identifier sequence number for the second message are detected. At block 422, the second message is dequeued prior to the first message based on the second message identifier sequence number being before the first message identifier sequence number. At block 418, a determination is made whether the first delivery time is before the second delivery time. If so, the first message is dequeued prior to the second message at block 424. If the first delivery time is not before the second delivery time, the second message is dequeued prior to the first message at block 426.

Figure 5:
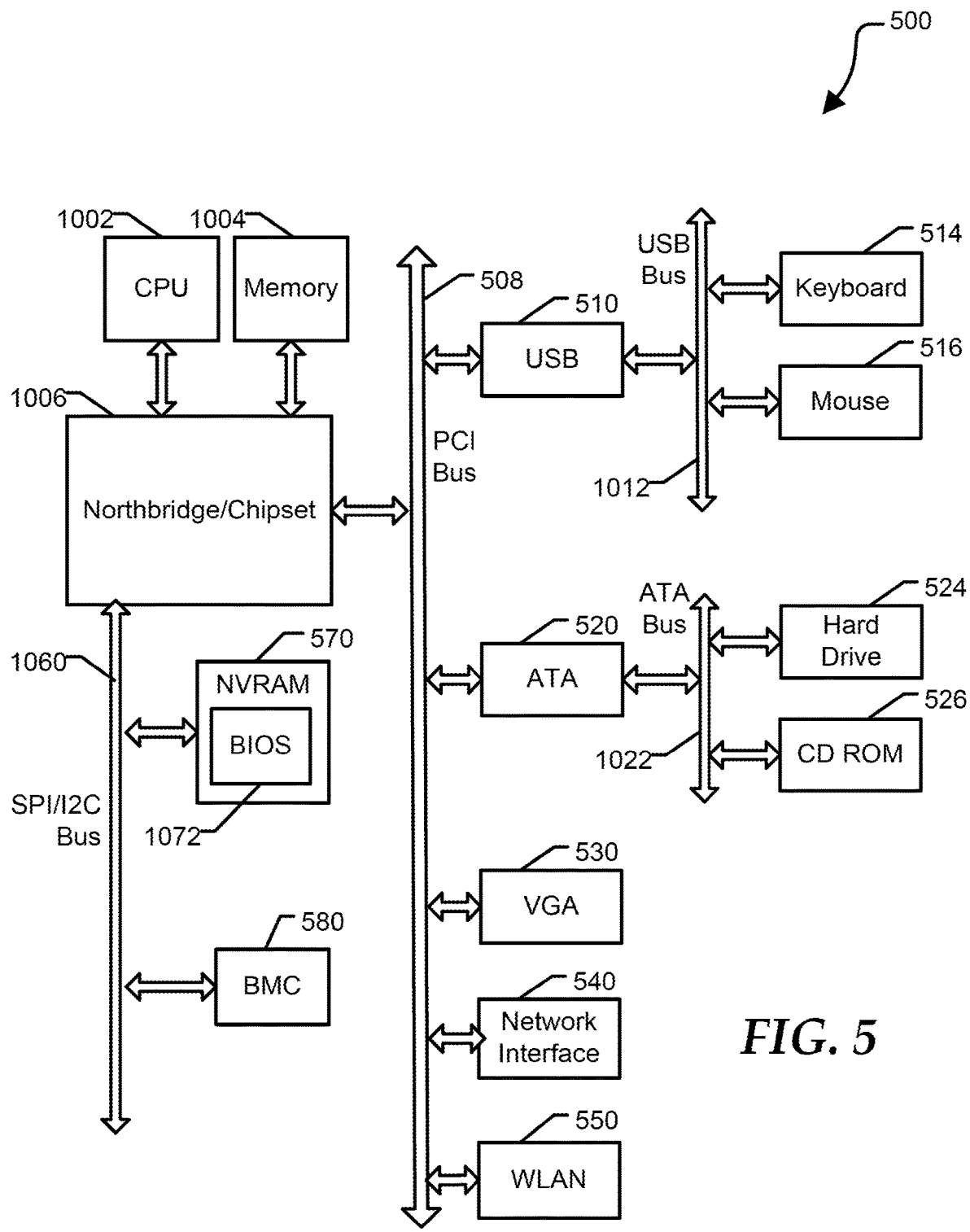
FIG. 5 is a block diagram of a general information handling system according to an embodiment of the present disclosure.

FIG. 5 shows an information handling system 500 including a processor 502, a memory 504, a northbridge/chipset 506, a PCI bus 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

System 500 can include additional processors (not shown at FIG. 1) that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 50.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, i.e. a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method performed by a device, the method comprising:
   receiving first and second messages;
   identifying a first priority level of the first message and a second priority level of the second message;
   determining that the second priority level is higher than the first priority level;
   in response to the second priority level being higher than the first priority level, dequeueing the second message before the first message;
   in response to the second priority level being substantially equal to the first priority level, detecting a first delivery time for the first message, and a second delivery time for the second message, wherein the first delivery time is a first time that the first message needs to arrive at a consumer circuit, and the second delivery time is a second time that the second message needs to arrive at the consumer circuit;
   enqueueing the first message into a first queue at a first enqueue time, and a second message into the first queue at a second enqueue time;
   storing the first delivery time and the first enqueue time for the first message and the second delivery time and the second enqueue time for the second message;
   in response to determining that the first delivery time is before the second delivery time, dequeueing the first message from the first queue prior to the second message; and
   in response to determining that the first delivery time is substantially equal to the second delivery time:
   determining a first message identifier sequence number for the first message and a second message identifier sequence number for the second message; and
   dequeueing the second message from the first queue of the first memory structure prior to the first message in response to the second message identifier sequence number being lower than the first message identifier sequence number.

2. The method of claim 1, wherein enqueueing the first message into the first queue comprises:
   storing the first message at a first-in-order location of the first queue in response to determining that the first delivery time is before the second delivery time.

3. The method of claim 2, wherein enqueueing the second message into the first queue comprises:
storing the second message at a second-in-order location of the first queue in response to determining that the first delivery time is before the second delivery time.

4. The method of claim 1, further comprising:
receiving, at a second queue, the first and second messages and a third message;
enqueuing the first, second, and third messages;
detecting a third delivery time for the third message; and
in response to determining that the third delivery time is before the first and second delivery times, dequeueing the third message from the second queue prior to the first and second messages.

5. The method of claim 4, wherein the first, second, and third messages are each sent from different providers.

6. The method of claim 1, wherein the first message was delayed before being enqueued in the first queue in response to a first device processing the first message being offline for a specific amount of time.

7. The method of claim 1, wherein the first queue is a service level agreement first-in first-out queue.

8. The method of claim 1, wherein the first message is sent from a first provider module and the second message is sent from a second provider module.

9. A method performed by a device, the method comprising:
receiving first and second messages;
identifying a first priority level of the first message and a second priority level of the second message;
determining that the second priority level is higher than the first priority level;
in response to the second priority level being higher than the first priority level, dequeueing the second message before the first message;
in response to the second priority level being substantially equal to the first priority level, detecting a first delivery time for the first message, and a second delivery time for the second message, wherein the first delivery time is a first time that the first message needs to arrive at a consumer circuit, and the second delivery time is a second time that the second message needs to arrive at the consumer circuit;
enqueueing the first message into a first queue at a first enqueue time, and a second message into the first queue at a second enqueue time;
storing the first delivery time and the first enqueue time for the first message and the second delivery time and the second enqueue time for the second message;
in response to determining that the first delivery time is before the second delivery time, dequeueing the first message from the first queue prior to the second message;
in response to determining that the first delivery time is substantially equal to the second delivery time:
determining a first message identifier sequence number for the first message and a second message identifier sequence number for the second message; and
dequeuing the first message from the first queue of the first memory structure prior to the second message in response to the first message identifier sequence number being lower than the second message identifier sequence number;
receiving a third message after dequeueing the first message;
enqueueing the third message into the first queue;
detecting a third delivery time for the third message; and
in response to determining that the third delivery time is before the second delivery time, dequeueing the third message from the first queue prior to the second message.

10. The method of claim 9, wherein enqueueing the first message into the first queue comprises:
storing the first message at a first-in-order location of the first queue in response to determining that the first delivery time is before the second delivery time.

11. The method of claim 10, wherein enqueueing the second message into the first queue comprises:
storing the second message at a second-in-order location of the first queue in response to determining that the first delivery time is before the second delivery time.

12. The method of claim 9, wherein the first message is sent from a first provider module and the second message is sent from a second provider module.

13. The method of claim 9, wherein the first message was delayed before being enqueued in the first queue in response to a first device processing the first message being offline for a specific amount of time.

14. An information handling system comprising:
first and second provider circuits, the first provider circuit to provide a first message, and the second provider circuit to provide a second message;
a first memory structure including a first queue to store the first and second messages, and to store a first delivery time and a first enqueue time for the first message and a second delivery time and a second enqueue time for the second message, wherein the first message is queued into the first queue at the first enqueue time and the second message is queued into the first queue at the second enqueue time; and
a first intermediate integration circuit configured to communicate with the first and second provider circuits and with the first memory structure, the first intermediate integration circuit to receive the first and second messages, to identify a first priority level of the first message and a second priority level of the second message, to determine that the second priority level is higher than the first priority level, in response to the second priority level being higher than the first priority level, to dequeue the second message before the first message, in response to the second priority level being substantially equal to the first priority level, to detect the first delivery time for the first message and the second delivery time for the second message, wherein the first delivery time is a first time that the first message needs to arrive at a consumer circuit, and the second delivery time is a second time that the second message needs to arrive at the consumer circuit, to dequeue the first message from the first queue of the first memory structure prior to the second message in response to a determination that the first delivery time is before the second delivery time, and in response to a determination that the first delivery time is substantially equal to the second delivery time: to determine a first message identifier sequence number for the first message and a second message identifier sequence number for the second message, and to dequeue the second message from the first queue of the first memory structure prior to the first message in response to the second message identifier sequence number being lower than the first message identifier sequence number.

15. The information handling system of claim 14, further comprising:
a second intermediate integration circuit configured to communicate with the first memory structure, the second intermediate integration circuit to identify the first priority level of the first message, to identify the second priority level of the second message, to determine that the second priority level is higher than the first priority level, and to dequeue the second message before the first message in response to the second priority level being higher than the first priority level.

16. The information handling system of claim 14, wherein the first message is stored at a first-in-order location of the first queue in response to the first delivery time being before the second delivery time.

17. The information handling system of claim 14, further comprising:
a second memory structure including a second queue to store the first and second messages, and a third message; and
a second intermediate integration circuit configured to communicate with the first memory structure and with the second memory structure, the second intermediate integration circuit to detect a third delivery time for the third message, to dequeue the third message from the second queue of the second memory structure prior to the second message in response to a determination that the third delivery time is before the first and second delivery times.

18. The information handling system of claim 17, wherein third message is from a third provider circuit.

19. The information handling system of claim 14, wherein the first message was delayed before being enqueued in the first queue in response to a first device processing the first message being offline for a specific amount of time.

* * * * *